United States Patent [19]

Cope

[11] Patent Number: 4,731,933

[45] Date of Patent: Mar. 22, 1988

[54] PROTRACTOR-CHALKLINE

[76] Inventor: Charles D. Cope, R.D. #1, Box 36, Willow Street, Pa. 17584

[21] Appl. No.: 889,197

[22] Filed: Jul. 25, 1986

[51] Int. Cl.[4] .......................... B44D 3/38; G01C 15/16
[52] U.S. Cl. ...................................... 33/414; 33/1 LE; 33/424; 33/534
[58] Field of Search .............. 33/413, 414, 1 LE, 534, 33/424

[56] References Cited

U.S. PATENT DOCUMENTS

| | | | |
|---|---|---|---|
| 661,483 | 11/1900 | Barrie | 33/413 X |
| 1,373,884 | 4/1921 | Gregory | 33/414 |
| 1,401,200 | 12/1921 | Smith | 33/1 LE |
| 2,586,074 | 2/1952 | Memluck | 33/1 LE |
| 2,673,398 | 3/1954 | Baumgart | 33/414 |
| 3,533,164 | 10/1970 | Bloom | 33/1 LE |

Primary Examiner—William D. Martin, Jr.
Attorney, Agent, or Firm—Daniel J. O'Connor

[57] ABSTRACT

A chalkline device situated on a protractor in such a manner which permits the chalkline string to extend from the centerpoint of the protractor's radius past the degree markings on the protractor. By placing the centerpoint side of the protractor on any straight surface and extending the chalkline string past the degree markings any angle measurement can, by the chalkline string, be determined and marked in the same process. The chalkline string serves as both the hand of a dial and a medium for conveyance of the chalk to the surface being marked or measured.

6 Claims, 5 Drawing Figures

PROTRACTOR-CHALKLINE

FIELD OF THE INVENTION

This hand tool was primarily derived for the field of carpentry construction. However, through subsequent testing and research it has proven extremely useful in many of the co-related mechanical trades whete the determination of angles and plumb and level lines is necessary. More specifically, this is a labor-saving device not requiring the cumbersome methods and tools craftsmen now use for marking angles.

DESCRIPTION OF PRIOR ART

The need for plumb, level or angle lines has existed in the mechanical or construction fields for many years. Currently, one of the most commonly used tools for determining angles is the "Carpenter's Square" or Framing Square. Though accurate and quite functional, its 24 inch reach limits greatly its effectiveness especially on much of the 4'×8' materials presently popular in the construction field. Also the framing square does not have within itself the capacity of marking the line determined by its user. The "square" is used to determine the angle, but the chalkline is used to mark and extend the angle to a more useful length. Also, neither the square nor chalkline can be used without the use of a leveling device to determine a level line. My invention is quicker, easier to use, and more flexible than all three of the previously mentioned tools. It can be made in various sizes and materials. The proto-type has been made of plexiglass and is approximately the size of the chalkline devices currently in use. My invention allows the user to comfortably determine and mark plumb, level or angle lines with the use of one device in lieu of the thread or more devices presently needed for the same functions.

SUMMARY OF THE INVENTION

This invention was conceived to determine and mark angles with greater ease and quickness than the use of conventional tools, i.e. the framing square and chalkline. This invention accomplishes this task by combining the chalkline and the protractor in such a manner as to permit the chalkline to be the straight edge proceding from the centerpoint of the protractor and past the degree markings on the protractor. This protractor-chalkline can be made in any size but preferably would be made close to the size of conventional chalkline tools. It can be made of any material, however, the prototype is made of clear plexiglass which permits a better viewing of the chalkline as it passes by the degree markings on the protractor. The protractor's degree markings are situated between layers of plexiglass. This location prevents their wearing away. This invention can be:

1. Easily carried in any carpenter's belt or tool box.
2. Easily hand held and manipulated.
3. Used as a chalkline.
4. Used to determine degree, plumb, and level lines.
5. Used to mark lines it has already determined.
6. Easily manufactured with few moving parts and out of various materials.

Most importantly, this hand held device enables one person to quickly and easily determine and mark angles which cannot easily be determined and marked by current methods, i.e. the framing square and other such devices.

DESCRIPTION OF THE PREFERRED EMBODIMENT

The protractor-chalkline device is a clear plexiglass protractor (FIG. 1:2) with degree markings common to all protractors. The protractor-chalkline can be made of other materials but the clear plexiglass offers greater visibility of the chalkline. Also it should be noted that the degree markings are between two laminated layers of clear plastic so that the markings can not be scratched or worn from the surface of the protractor-chalkline.

Figure 1:
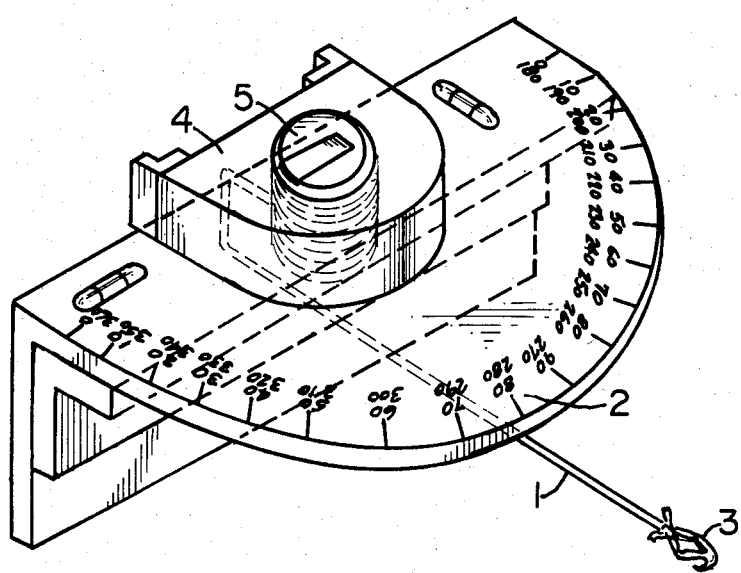
FIG. 1 is the top view of the protractor-chalkline. This view is an isometric view.
Figure 2:
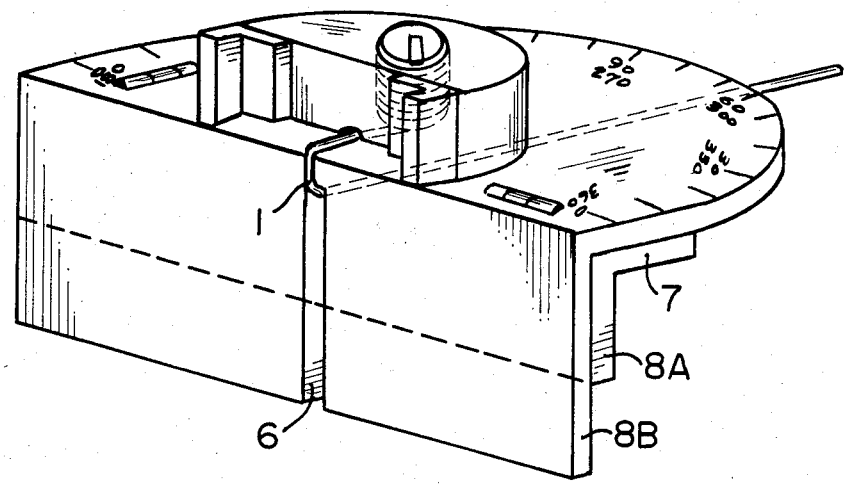
FIG. 2 is an isometric view of the rear of the protractor-chalkline.

The chalkline (FIG. 1:1) proceeds from the rear of the chalkline spool (FIG. 1:5) housed in the chalk containment department (FIG. 1:4). The chalkline (FIG. 2:1) then proceeds through the slot (FIG. 2:6) located at the centerpoint of the protractor as seen in FIG. 1:2. The chalkline then proceeds under the protractc ̄ (FIG. 1:2). FIG. 2:7 shows a ledge which is designed to elevate the protractor from the surface being marked. This elevation of the protractor is necessary to prevent impedance of the chalkline's movement under the protractor. The straight surfaces (FIG. 2:8A and FIG. 2:8B) provide an accurate and steady means of holding the protractor-chalkline against any straight surface, i.e. a wall or different types of sheathing.

Figure 3:
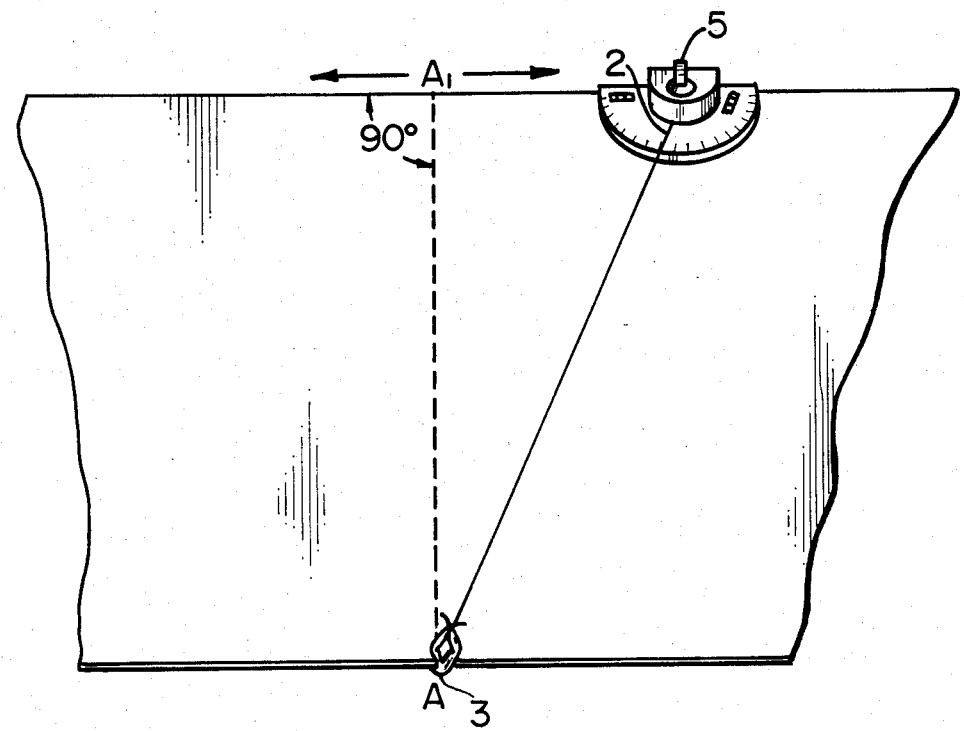
FIG. 3 is an isometric view of the preferred method for use in determining and marking materials in a horizontal or diagonal position.
Figure 3A:
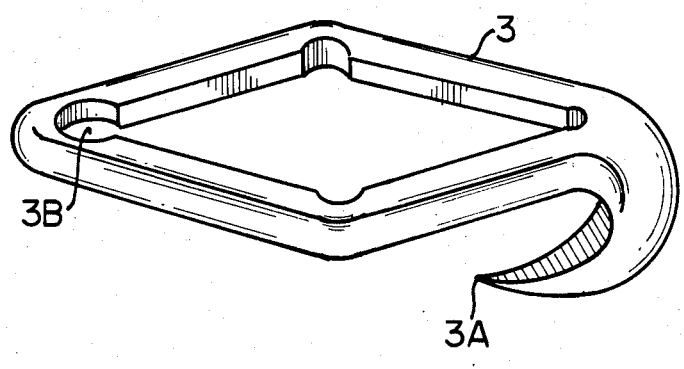
FIG. 3A is an isometric view of the chalkline hook design change necessary to keep the chalkline secure while moving the chalkline-protractor device.

The preferred method for marking materials such as sheathing is seen in FIG. 3. By placing the chalkline hook (FIG. 3:3) at position A and allowing enough line from the spool (FIG. 3:5) to move the protractor-chalkline to position $A_1$, the protractor-chalkline is now in a position so that the ledge (FIG. 1:8A) is resting aainst the edge of the sheathing. The protractor-chalkline can then be slid in either direction on the edge of the sheathing until the desired anglee can be read on the protractor (FIG. 3:2) The chalkline spool (FIG. 3:5) provides for necessary tightening or loosening of the chalkline string. The chalkline hook FIG. 3A needed for modification from standard chalkline hooks to permit the chalkline's movement without the hook's release. The hook itself (Detail A:3A) had to be bent into a U-shape and then sharpened to a point. This point enables the chalkline to pivot from this position (FIG. 3A) without releasing the chalkline as the protractor-chalkline is slid to the desired position (FIG. $3:A_1$).

Figure 4:
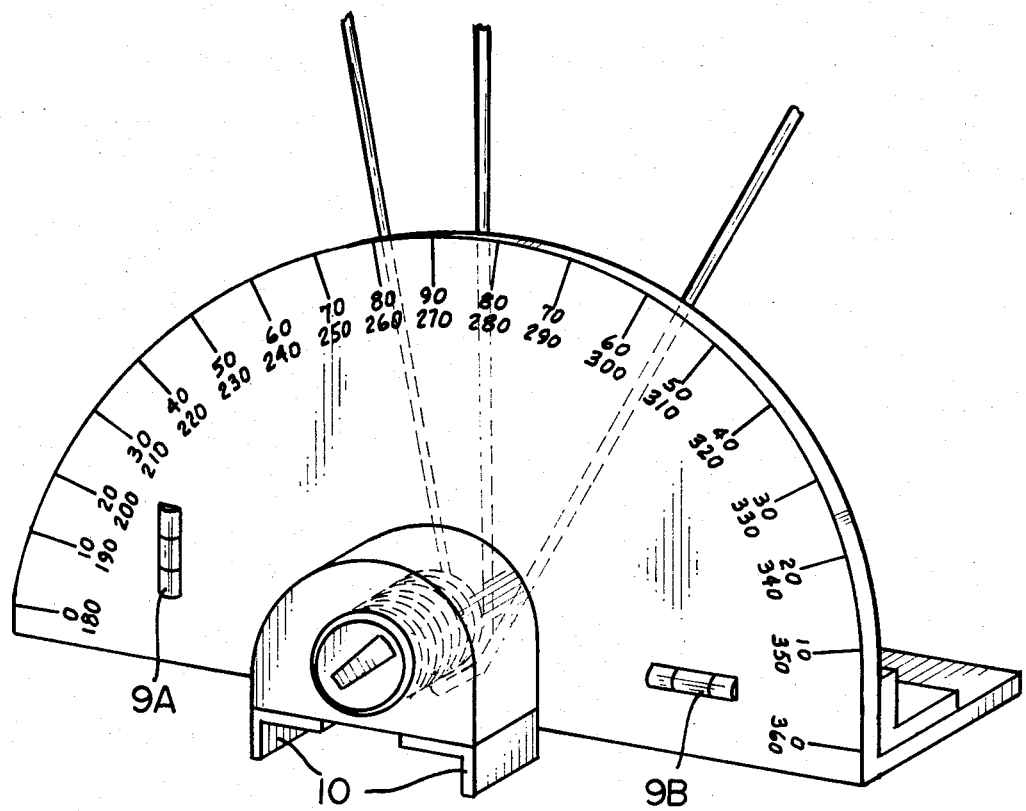
FIG. 4 is an isometric view showing the invention being used to determine degrees in a vertical or horizontal position.

The protractor-chalkline can also determine vertical angles as illustrated by several possible line positions in FIG. 4 through the use of a bubble level indicator (FIG. 4:9B). The legs (FIG. 4:10) hold the protractor-chalkline erect while plumb or vertical angles are determined and marked. A level line can be determined and marked where, due to irregular or unlevel floors, a transit level would normally be required. The protractor-chalkline can in lieu of a transit level determine a level line through the use of the bubble level seen in FIG. 4:9A, and the chalkline string passing under the 90 degree marking on the protractor-chalkline.

What is claimed is:

1. An angle marking device comprising:
   a semi-circular protractor (2) having a first top side, a second bottom side, a front curved edge and a rear straight edge,
   the first top side of said semi-circular protractor (2) having a compartment means (4) mounted thereon,
   said compartment means (4) having a line and spool (5) contained therein and said compartment means being adapted to contain a powder chalk marking substance therein,
   said compartment means (4) having an aperture means at the rear thereof for running said line therethrough,
   wherein said semi-circular protractor (2) has an edge (8B) extending at right angles from said rear straight edge and wherein a slot (6) is formed at substantially the middle portion of said edge (8B) to provide means whereby said line may be extended under said semi-circular protractor (2) for use as an angle marking device.

2. The angle marking device of claim 1 wherein the second bottom side of said semi-circular protractor (2) has a ledge means (7) mounted thereon to elevate the protractor from a surface to be marked.

3. The angle marking device of claim 2 wherein the first top edge of said semi-circular protractor has at least one bubble level indicator (9A, 9B) mounted thereon.

4. The angle marking device of claim 3 wherein the end of said line (1) has a sharpened U-shaped hook means (3A) attached thereto.

5. The angle marking device of claim 4 wherein said semi-circular protractor (2) is comprised of clear plexiglass means to allow viewing of the line as it passes under said protractor.

6. The angle marking device of claim 5 wherein said compartment means (4) has at least one leg means (10) mounted to a rear surface thereof to allow the determination and marking of vertical angles.

* * * * *